United States Patent
Mandokoro et al.

(10) Patent No.: US 7,036,827 B2
(45) Date of Patent: May 2, 2006

(54) THREE DIRECTIONAL OPENING/CLOSING CHUCK

(75) Inventors: Jiro Mandokoro, Tsukuba-gun (JP); Hiroshi Hanne, Tsukuba-gun (JP); Takashi Yasuoka, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 461 days.

(21) Appl. No.: 10/427,945

(22) Filed: May 2, 2003

(65) Prior Publication Data
US 2003/0222415 A1    Dec. 4, 2003

(30) Foreign Application Priority Data
Jun. 3, 2002 (JP) ............... 2002-161962

(51) Int. Cl.
*B23B 31/30* (2006.01)

(52) U.S. Cl. ................. 279/4.11; 279/118

(58) Field of Classification Search .......... 279/4.1, 279/4.11, 4.12, 118, 119; B23B 31/30

See application file for complete search history.

(56) References Cited

U.S. PATENT DOCUMENTS

| | | | | | |
|---|---|---|---|---|---|
| 1,959,081 | A | * | 5/1934 | Le Jeune | 279/2.09 |
| 3,782,742 | A | * | 1/1974 | Fink et al. | 279/110 |
| 4,482,162 | A | * | 11/1984 | Anegawa | 279/4.12 |
| 5,428,155 | A | * | 6/1995 | Sherry et al. | 540/474 |
| 6,299,179 | B1 | * | 10/2001 | Sheffer | 279/4.12 |
| 6,425,584 | B1 | * | 7/2002 | Stickney | 279/119 |
| 6,460,862 | B1 | * | 10/2002 | Shimizu | 279/4.12 |
| 6,679,503 | B1 | * | 1/2004 | Yamazaki et al. | 279/123 |

* cited by examiner

*Primary Examiner*—Boyer D. Ashley
*Assistant Examiner*—J Williams
(74) *Attorney, Agent, or Firm*—Oblon, Spivak, McClelland, Maier & Neustadt, P.C.

(57) ABSTRACT

Cylinder mechanisms are provided for driving three jaw members each of which includes a cylinder hole having a long circular cross section, a piston which slides in the cylinder hole and has a long circular cross section, and a piston rod extending from the piston. The cylinder mechanisms are disposed at a position in the chuck body which is adjacent to corresponding jaw member in a state in which an axis of the cylinder hole in a direction parallel to a moving direction of the jaw member and a shorter diameter of the cylinder hole is directed in an axial direction of the chuck body.

12 Claims, 6 Drawing Sheets

FIG. 9
FIG. 10
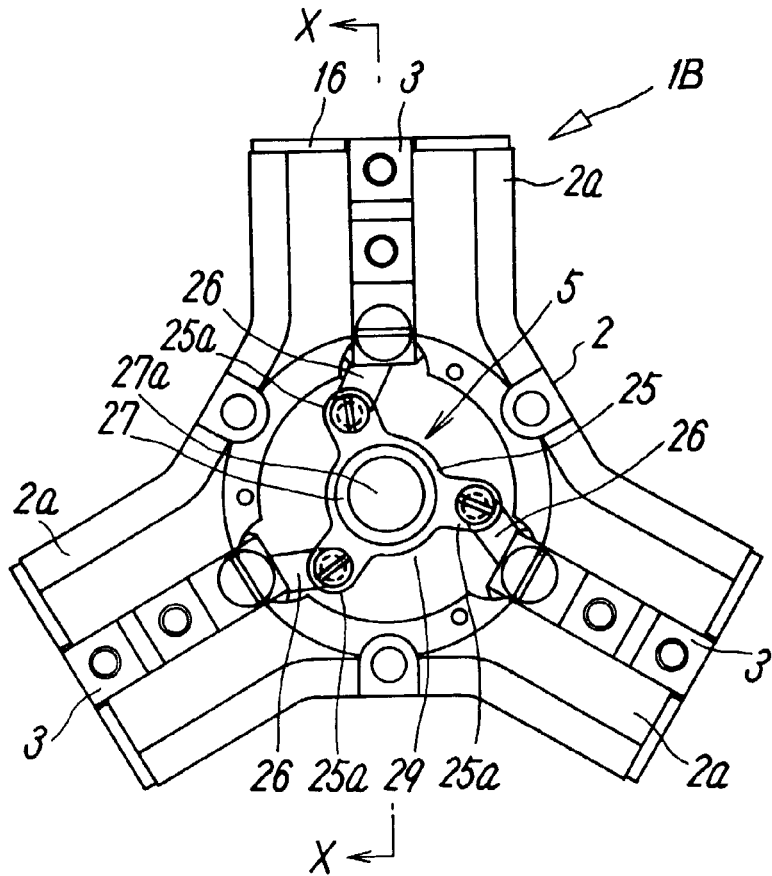
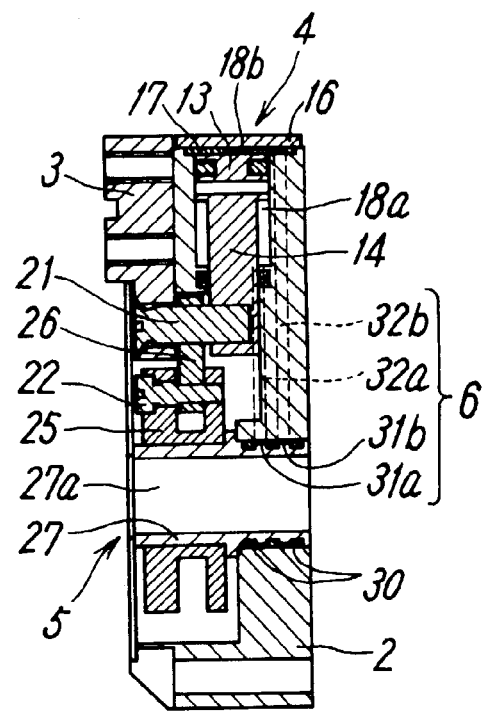

THREE DIRECTIONAL OPENING/CLOSING CHUCK

TECHNICAL FIELD

The present invention relates to a chuck of a type in which three jaw members are opened and closed in a radial direction to grasp a workpiece, and more particularly, to a three directional opening/closing chuck which is thin as a whole and has a great grasping force of the jaw members.

PRIOR ART

A chuck of a type in which three jaw members grasp a workpiece is conventionally known in Japanese Patent Application Laid-open No. 11-262885, No. 11-254370, No. 2001-105372 and the like for example. This kind of chuck comprises three jaw members which move in radial directions, three cylinder mechanisms for individually actuating the jaw members, and a rotary disc type synchronizing mechanism for operating the jaw members in synchronism with each other. The cylinder mechanisms are disposed at positions corresponding to the jaw members of the chuck body, respectively.

In such a chuck, in order to increase the grasping force of the jaw members, a large cylinder mechanism having a great driving force should be used. In the case of the large cylinder mechanism, however, since diameters of a cylinder and piston are large, if they are incorporated, the size of the chuck body in its axial direction becomes large, and the chuck is increased in size.

Thereupon, in the chuck described in the above publications, pairs of small cylinder mechanisms which are actuated in synchronism with each other are used instead of the single large cylinder mechanism, and such pairs of small cylinder mechanisms are respectively disposed at positions corresponding to the jaw members in parallel.

According to the method for disposing the pairs of small cylinder mechanisms in parallel in this manner, however, although it is possible to reduce the vertical size of the chuck body and to make the chuck body thin, since both the cylinder mechanism must be disposed a distance from each other, the lateral size of the chuck body is increased at the installation position. Further, the individual cylinder mechanism is small in size and a driving force thereof is small. Therefore, if the entire cylinder mechanisms are taken into consideration, there is a drawback in that, although the lateral size is large, the grasping force of the jaw members is small.

In the chuck, when a workpiece is grasped, a piston rod of each cylinder mechanism and each jaw member moves forward and backward in the radial direction, but since a rotary disc constituting a synchronizing mechanism for synchronizing the operations of the jaw members is disposed at a central portion of the chuck, the stroke of the piston rod is limited by the rotary disc, and the rotary disc hinders the opening and closing stroke of the jaw member from increasing.

DISCLOSURE OF THE INVENTION

In a chuck of a type which opens and closes three jaw members in a radial direction to grasp a workpiece, it is a main technical object of the present invention to make a cylinder mechanism which drives each jaw member into a special structure so that the chuck is thin in size as a whole and a great grasping force can be obtained.

It is another technical object of the invention to provide a thin three directional opening/closing chuck having great opening and closing stroke of the jaw members.

To achieve the above objects, the present invention provides a three directional opening/closing chuck comprising a chuck body having a plurality of ports, three jaw members movably disposed in the radial direction around a center axis of the chuck body, three cylinder mechanisms for individually driving the jaw members, a synchronizing mechanism for synchronizing motions of the three jaw members, and a flow path assembly connecting the ports and the cylinder mechanisms, wherein each of the cylinder mechanisms includes a cylinder hole having a long circular cross section, a piston which slides in the cylinder hole and has a long circular cross section, and a piston rod extending from the piston, the cylinder mechanism is disposed at a position in the chuck body which is adjacent to corresponding jaw member in a state in which an axis of the cylinder hole in a direction parallel to a moving direction of the jaw member and a shorter diameter of the cylinder hole is directed in an axial direction of the chuck body.

In the chuck of the present invention having the above structure, the cylinder mechanism which drives the jaw member includes the cylinder hole and the piston both having the long circular cross sections, and the cylinder mechanism is disposed in a state in which the axis of the cylinder hole is directed parallel to the moving direction of the jaw member and a short diameter of the cylinder hole is directed to the axial direction of the chuck body. Therefore, as compared with a case in which the shape of the cross section of the cylinder hole is circle and its cross sectional area is the same as that of the present invention, it is possible to reduce the length of the chuck body in its axial direction and to reduce the chuck body in thickness. Further, as compared with a case in which a pair of small cylinder mechanisms are arranged side-by-side at a distance therebetween, the present invention does not require such distance, it is possible to reduce the chuck body in its lateral size, and to increase the areas of cross sections of the cylinder hole and the piston. Therefore, there is a merit in that the driving force is increased and the grasping force of the jaw members is increased.

In the present invention, it is preferable that the shapes of the cross sections of the cylinder hole and the piston are long circular shapes comprising semi-circular portions located at opposite ends of the long axial direction and straight line portions connecting the semi-circular portions, and the length of the straight line portion is 1.5 times or more than a radius of the semi-circular portion.

In the present invention, it is preferable that the synchronizing mechanism includes a central member rotatably disposed on the center axis of the chuck body, and a link for connecting to the piston rod and jaw member of the cylinder mechanism having three connection arms extending in the radial direction of said central member, the central member including a recessed escaping portion into which a tip end of the piston rod is fitted at the forward stroke end between the adjacent connection arms.

In this manner, if the central member is provided with the escaping portion, the tip end of the piston rod is fitted into the escaping portion at the position of the forward stroke end, since the stroke of the piston rod is not limited by the central member, the stroke of the piston rod, i.e., the opening and closing stroke of the jaw member can be increased.

According to a concrete embodiment of the present invention, one end of the link and the piston rod and the jaw member are rotatably connected with each other by a first connection pin which connects the piston rod and the jaw member with each other, and the other end of the link and the connection arm of the central member are rotatably connected to each other by a second connection pin.

In the present invention, the flow path assembly includes two central flow paths arranged on an outer periphery of a rotary support shaft located at a center of the central member, and a plurality of distribution flow paths which extend from the central flow paths toward the cylinder mechanism through the chuck body and which are respectively in communication with pressure chambers on opposite sides of the piston, and a portion of the distribution flow paths is in communication with the ports.

In this case, it is preferable that a hole lid which closes an outer end of the cylinder hole is provided with an elastic body which functions as a seal of the pressure chamber and a damper for the piston, the elastic body includes a groove which brings an end of the distribution flow path and the pressure chamber.

In the present invention, a through hole into which a pipe or other member is inserted can be provided at a central portion between the central member and the rotary support shaft.

BRIEF DESCRIPTION OF THE DRAWINGS

FIG. 9 is a bottom view showing a second embodiment of the three directional opening/closing chuck of the invention.

FIG. 10 is a sectional view taken along a line X—X in FIG. 9.

DETAILED DESCRIPTION

Figure 1:
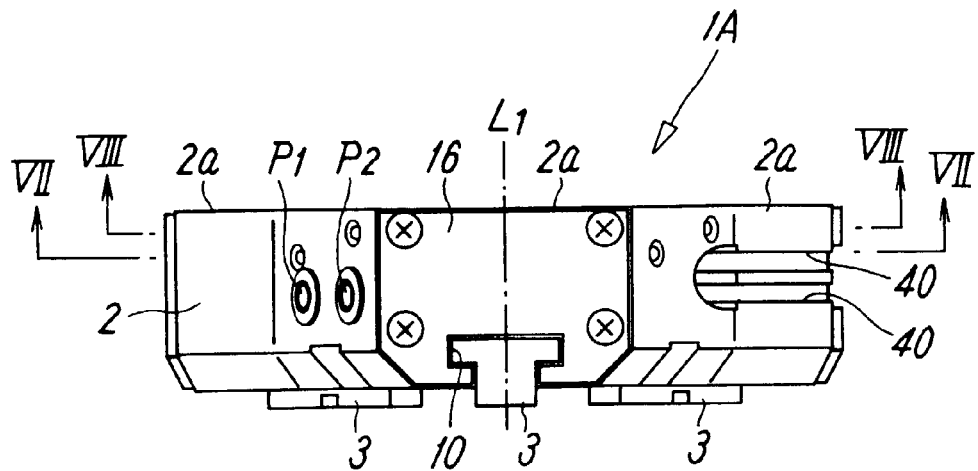
FIG. 1 is a side view showing a first embodiment of a three directional opening/closing chuck according to the present invention.

FIGS. 1 to 8 show a first embodiment of the three directional opening/closing chuck of the present invention. This chuck 1A includes a chuck body 2 provided at its side surface with two, i.e., first and second ports P1 and P2, three jaw members 3 disposed around a center axis L1 of the chuck body 2 such that the jaw members 3 can move in the radial direction, three cylinder mechanisms 4 for respectively driving the three jaw members 3, and a synchronizing mechanism 5 for synchronizing the operations of the three jaw members 3.

The chuck body 2 has a substantially trifurcated flat shape. Therefore, the chuck body 2 includes three extending portions 2a extending in the radial direction at equal angles from one an other around the center axis L1. Each of the extending portions 2a is provided with the jaw member 3 and the cylinder mechanism 4 one each. Each jaw member 3 has substantially T-shaped cross section, and the jaw member 3 is movably mounted in a guide groove 10 having substantially T-shaped cross section formed along the radial axis L2 in the extending portion 2a such that a portion of the jaw member 3 projects outward. An attachment is mounted to each jaw member 3 which is suited to a workpiece to be grasped, and the workpiece is grasped between the three jaw members 3 through the attachments.

Figure 4:
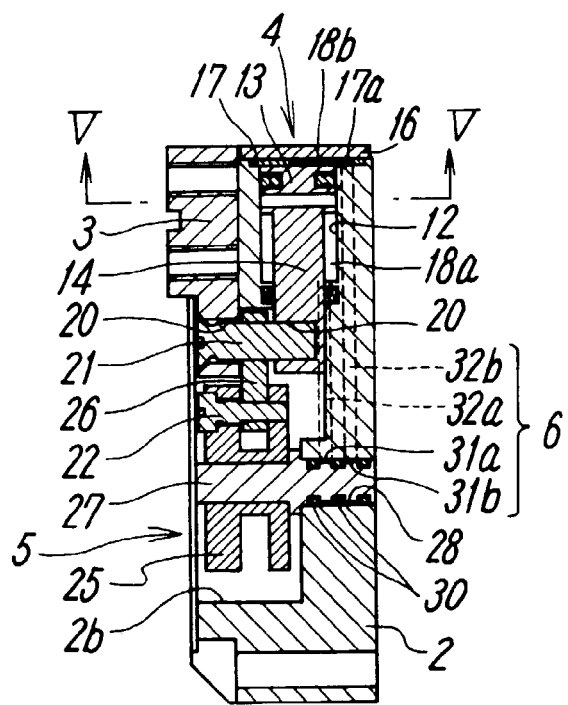
FIG. 4 is a sectional view taken along a line IV—IV in FIG. 3.
Figure 5:
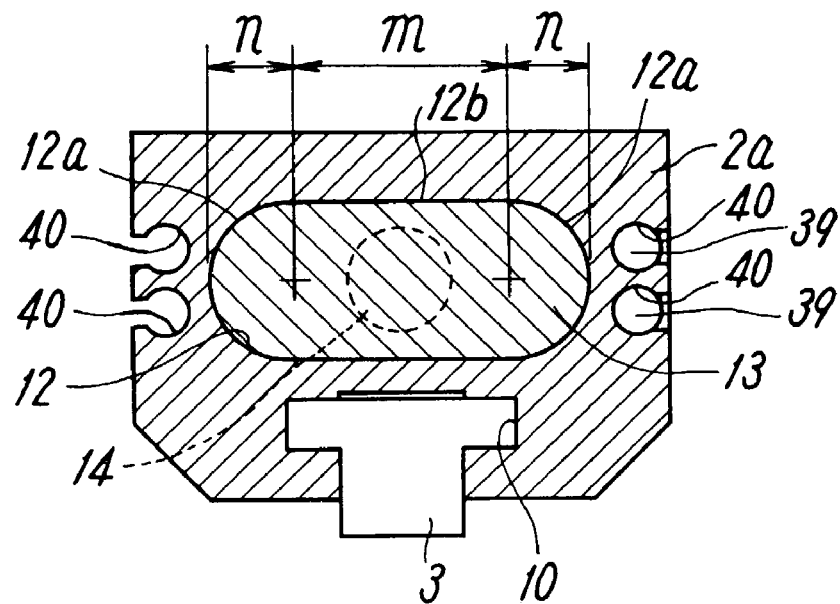
FIG. 5 is a sectional view taken along a line V—V in FIG. 4.
Figure 6:
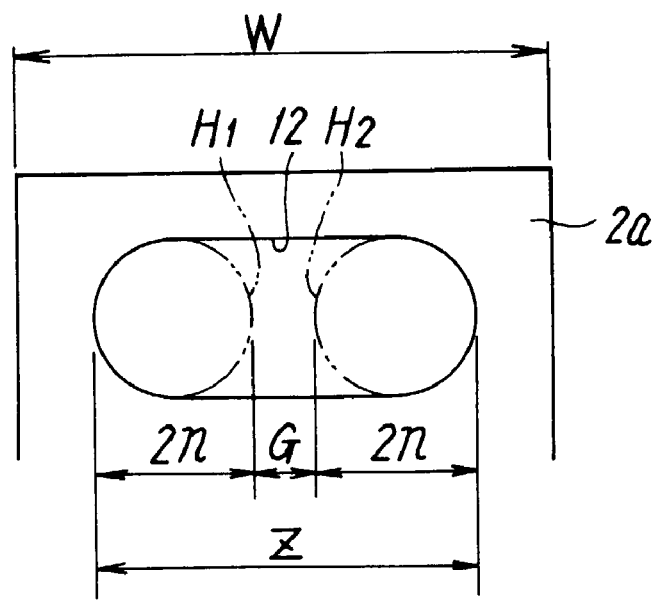
FIG. 6 is an explanatory view of a cylinder hole.

As shown in FIGS. 4 and 5, the cylinder mechanism 4 includes a cylinder hole 12 having long circular cross section, a piston 13 having a long circular cross section which slides in the cylinder hole 12 in a sealed state, and a piston rod 14 having a circular cross section extending from the piston 13 toward a center of the chuck body 2. The cylinder mechanisms 4 are disposed at positions in the extending portions 2a adjacent to the jaw members 3, i.e., at a position where the cylinder mechanisms 4 are parallel to the jaw members 3 in the vertical direction in a state in which the axis of the cylinder hole 12 is directed in a direction parallel to the moving direction of the jaw member 3, i.e., in a direction of the radial axis L2, and in a state in which a short diameter of the cylinder hole 12 is directed toward the axis L1 of the chuck body 2.

An outer end of the cylinder hole 12 is closed with a plate-like hole lid 16. The hole lid 16 is provided at an inner surface thereof with an elastic body 17 made of rubber or synthetic resin which functions as seal means and a damper which absorbs impact when the piston 13 reaches its retreating stroke end. The piston 13 is formed at its opposite sides with first and second pressure chambers 18a and 18b. The pressure chambers 18a and 18b are connected to the ports P1 and P2 by means of a later-described flow path assembly 6.

A tip end of the piston rod 14 and an inner end of the jaw member 3, i.e., an end of the jaw member 3 closer to the center of the chuck are formed with connection holes 20, respectively. If the first connection pin 21 is inserted into the connection hole 20, the jaw member 3 and the piston rod 14 are connected to each other. If the piston 13 and the piston rod 14 move forward and backward by action of fluid pressure, each jaw member 3 reciprocates in the radial direction.

In this manner, the cross sections of the cylinder hole 12 and the piston 13 are formed into the long circular shapes and they are disposed as described above. Therefore, as compared with the conventional technique in which the cross section of the cylinder hole 12 is circular and an area of cross section is equal to that of the above-described cylinder hole 12, it is possible to reduce the chuck body 2 in its axial direction and to make thinner the chuck body 2.

In the illustrated embodiment, as shown in FIG. 5, the cylinder hole 12 includes the long circular cross section comprising semi-circular portions 12a and 12a located at opposite ends in the long axial direction and having a certain radius of curvature, and straight line portion 12b connecting the semi-circular portions 12a and 12a, respectively, and a length m of the straight line portion 12b and a radium n of the semi-circular portion 12a are set such that a relation m>2n is established. As is disclosed in FIG. 6, a lateral region Z occupied by the long circular cylinder hole 12 in the extending portions 2a is substantially equal to that of a case in which two circular cylinder holes H1 and H2 having diameter of 2n are disposed at a distance G from each other. However, if attention is paid to the area of the cross section of the entire cylinder hole, one long circular cylinder hole 12 has a larger cross section. Therefore, long circular cylinder hole 12 has larger driving force of the cylinder mechanism 4, i.e., grasping force of workpiece by the jaw members 3.

However, the cylinder hole 12 may not always have the above-described dimensional relation. In order to obtain a grasping force which is equal to or greater than that when two cylinder holes H1 and H2 having the diameter 2n are arranged side-by-side, the length m of the straight line portion 12b and the radius n of the semi-circular portion 12a may be set such that a relation of m≧1.5n is established. With this arrangement, it is possible to obtain a chuck having a great grasping force without reducing or at least increasing a lateral width W of the extending portion 2a as compared with a case in which the two circular cylinder holes H1 and H2 are arranged side-by-side.

Figure 2:
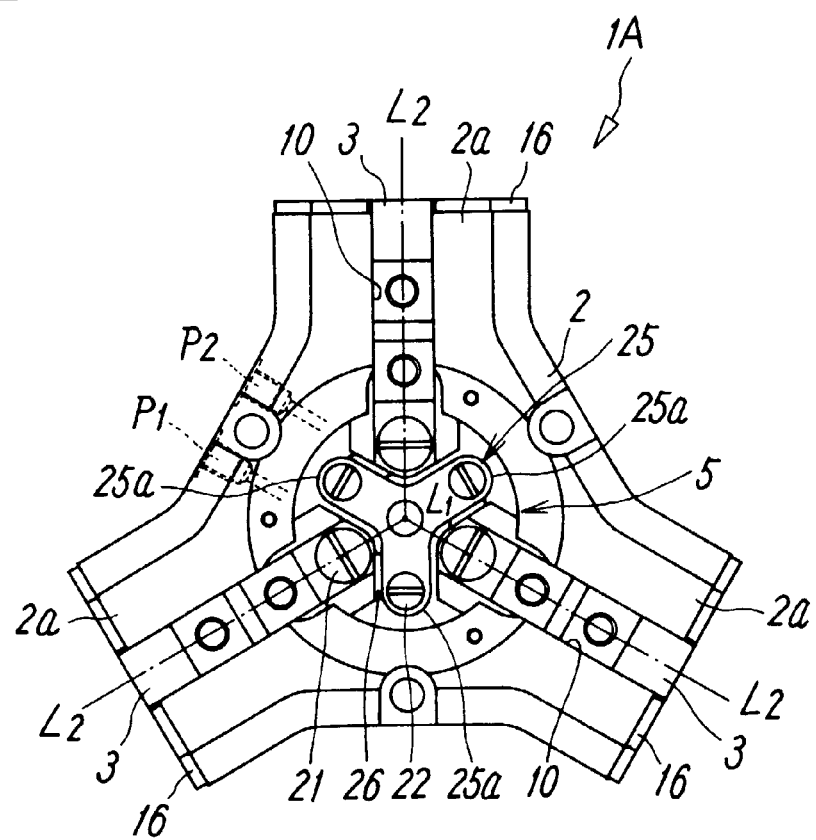
FIG. 2 is a bottom view of FIG. 1, showing a state in which each jaw member moves inward.
Figure 3:
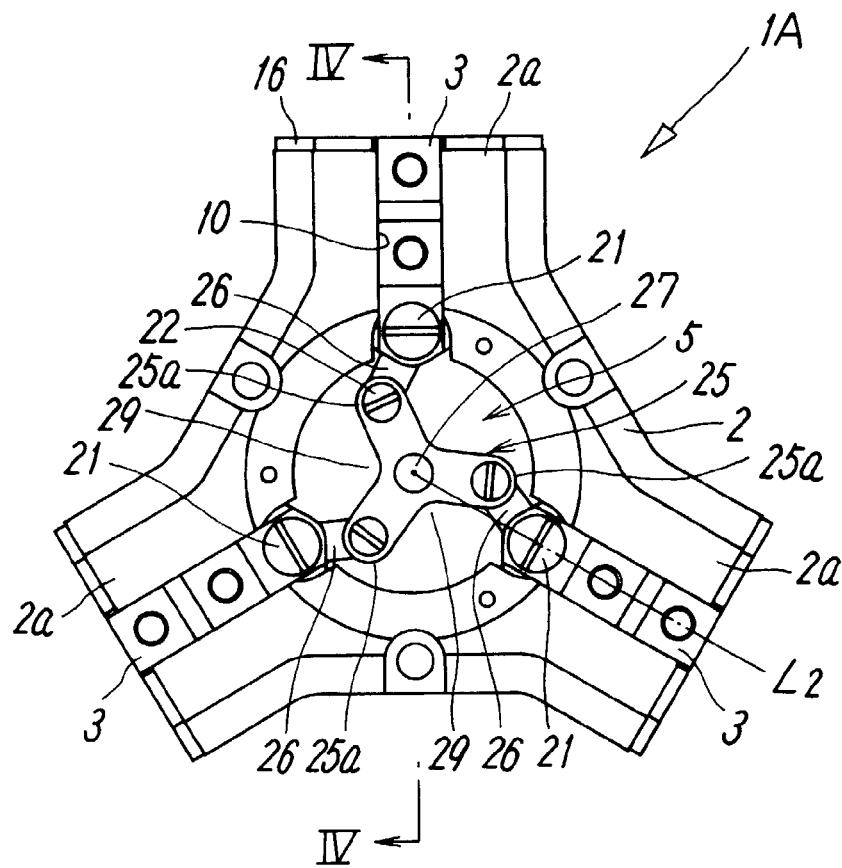
FIG. 3 is a bottom view of FIG. 1, showing a state in which each jaw member moves outward.

As is found from FIGS. 2 to 4, the synchronizing mechanism 5 for synchronizing the operations of the three jaw members 3 comprises a substantially trifurcated central member 25 which is rotatably disposed on the center axis L1 of the chuck body 2, and a plurality of links 26 for connecting the central member 25, the piston rods 14 of the cylinder mechanisms 4 and the jaw members 3 to each other. The central member 25 includes three-connection arms 25a extending in the radial direction, and a rotary support shaft 27 located at a center of the connection arms 25a. The central member 25 is disposed in a circular recess 2b formed in the chuck body 2, by rotatably inserting the rotary support shaft 27 into a support hole 28 formed at a central portion of a bottom surface of the recess 2b. The connection arm 25a, the piston rod 14 of the cylinder mechanism 4 and the jaw member 3 are connected to each other by the link 26.

One end of the link 26 is inserted between the piston rod 14 and the jaw member 3, and is rotatably connected to the first connection pin 21. The other end of the link 26 is inserted into a recess 25b formed in the connection arm 25a of the central member 25, and is rotatably connected to the connection arm 25a through a second connection pin 22. Therefore, the first connection pin 21 functions as means for connecting the piston rod 14 and the jaw member 3 with each other, and as means for connecting the link 26 with the piston rod 14 and the jaw member 3. If the piston rod 14, the jaw member 3 and the link 26 are connected by the same first connection pin 21, the structure becomes simple as compared with a case in which they are connected through individual connection pins.

The central member 25 is formed with a recessed escaping portion 29 between the adjacent connection arms 25a by forming a flat surface shape of the central member 25 into a substantially trifurcated shape. As shown in FIG. 2, the escaping portion 29 functions such that when the piston rod 14 reaches the forward stroke end, the escaping portion 29 prevents the tip end of the piston rod 14 from being fitted and from contacting with the central member 25. With this arrangement, the stroke of the piston rod 14 is not limited by the central member 25, and it is possible to increase the stroke of the piston rod 14, i.e., the opening and closing stroke of the jaw member 3.

By connecting the three jaw members 3 and the cylinder mechanisms 4 with each other through the synchronizing mechanism 5, the jaw members 3 are opened and closed in synchronism with each other. That is, in a state in which the piston 13 and the piston rod 14 of each cylinder mechanism 4 are at the forward stroke end and each jaw member 3 is moved to a position closer to an inner side of the extending portion 2a, i.e., at a position closer to the center of the chuck as shown in FIG. 2, if the piston 13 of each cylinder mechanism 4 is retreated by fluid pressure as shown in FIGS. 3 and 4, the piston rod 14 is also retreated and the jaw member 3 moves to a position closer to an outer end of the extending portion 2a along the radial axis L2. At that time, the central member 25 is pulled by the link 26 and rotated in the clockwise direction, and the motions of the three jaw members 3 are synchronized through the links 26. When the second connection pin 22 which connects the links 26 and the connection arms 25a with each other reaches positions slightly forward of the axes of the jaw members 3, i.e., at positions slightly forward of the radial axes L2, the central member 25 stops. At that time, the links 26 are slightly inclined with respect to the radial axes L2. If the central member 25 stops at such a position, the jaw members 3 can easily move in the opposite direction.

Next, from a state shown in FIGS. 3 and 4, if the piston 13 and the piston rod 14 of each cylinder mechanism 4 move forward, the jaw member 3 moves forward to a position closer to a center of the chuck as shown in FIG. 2. At that time, the central member 25 is pushed by the links 26 and rotated in the counterclockwise direction, and synchronizes the motions of the three jaw members 3 through the links 26, and stops when the connection arms 25a reach just intermediate positions of the adjacent jaw members 3. In other words, the central member 25 stops such that the piston rod 14 of each cylinder mechanism 4 is located just at the intermediate position of the adjacent connection arms 25a of the central member 25, and the central member 25 stops at a position where the tip end of the rod is fitted into the escaping portion 29.

An upper surface of the recess 2b is closed with a circular cover (not shown). At that time, this cover is provided with notches in the radial direction at positions corresponding to the jaw members 3 so that the circular cover does not hinder the motions of the jaw members 3.

The flow path assembly 6 connecting the pressure chambers 18a and 18b and the ports P1 and P2 on the opposite sides of the piston 13 of the cylinder mechanism 4 is constituted as follows. That is, as shown in FIG. 4, a plurality of annular seal members 30 are arranged and mounted to an outer periphery of the rotary support shaft 27 located at a center of the central member 25 such that necessary distance between the adjacent seal members 30 is maintained in the axial direction of the rotary support shaft 27. Two flow paths, i.e., first and second annular central flow paths 31a and 31b defined by the seal members 30 are formed between an outer peripheral surface of the rotary support shaft 27 and an inner peripheral surface of the support hole 28.

Figure 7:
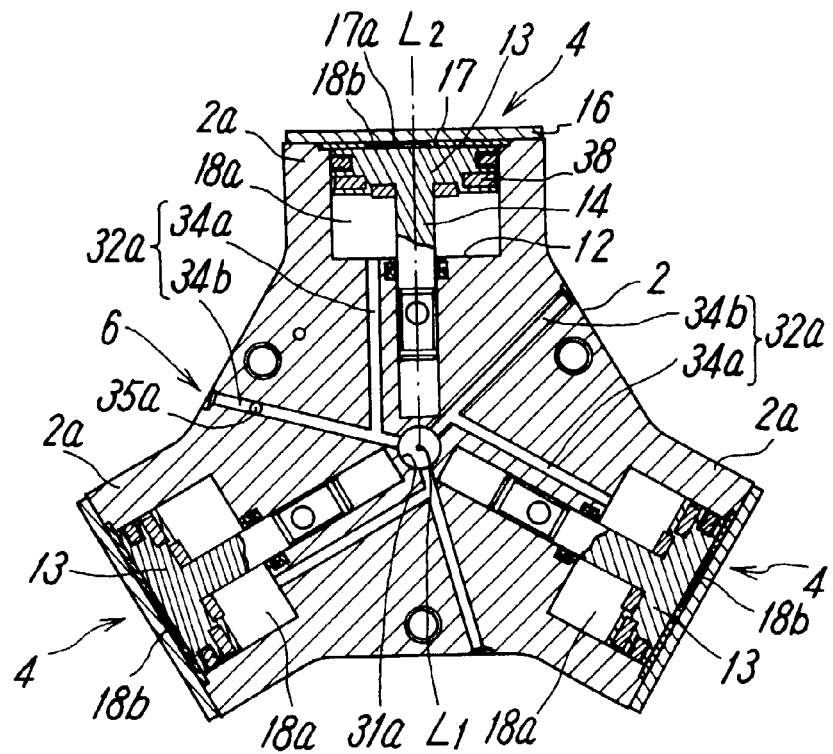
FIG. 7 is a sectional view taken along a line VII—VII in FIG. 1.
Figure 8:
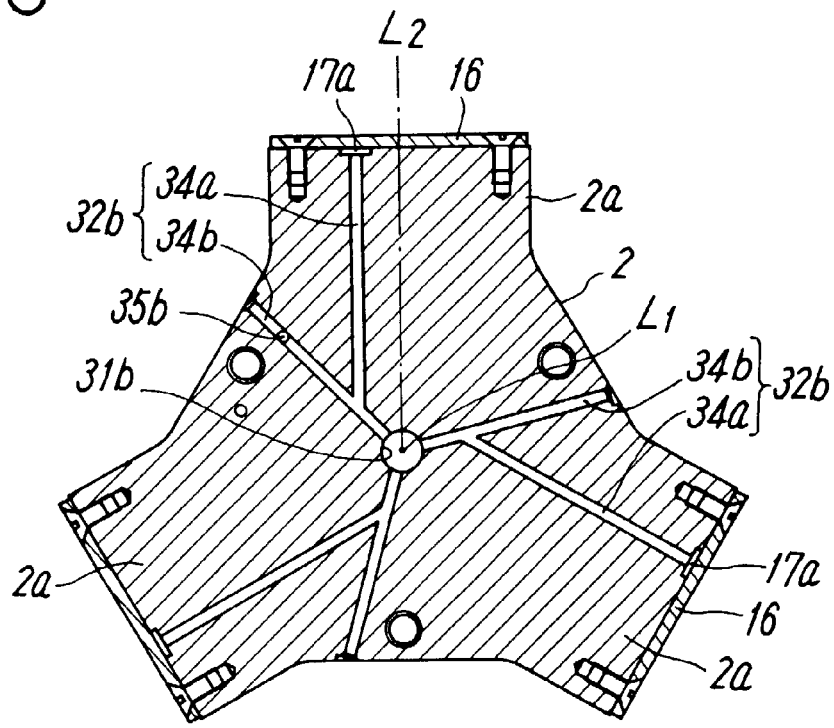
FIG. 8 is a sectional view taken along a line VIII—VIII in FIG. 1.
Figure 11:
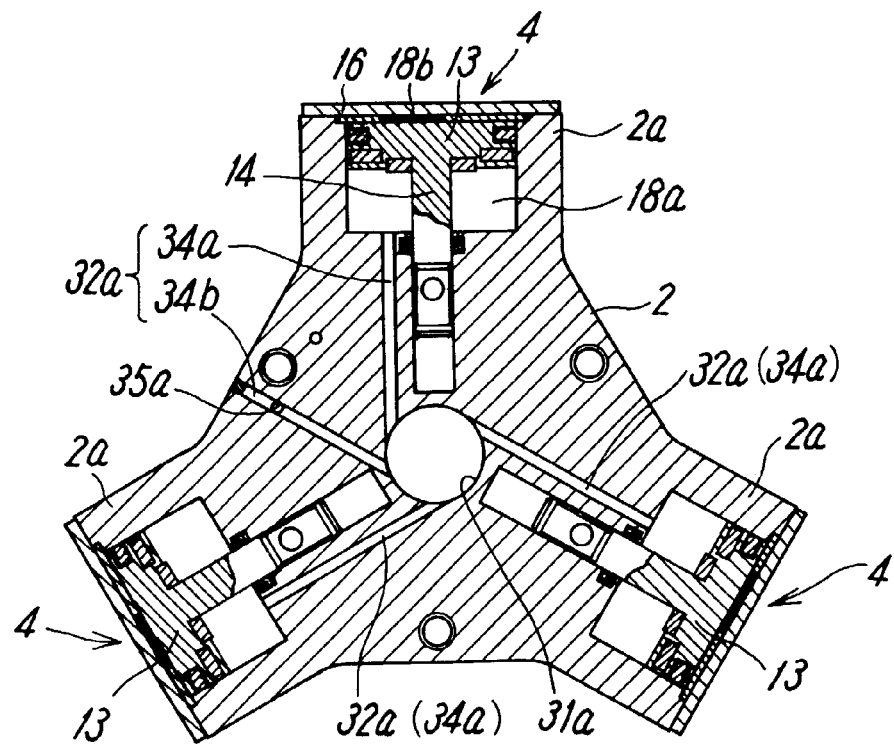
FIG. 11 is a sectional view of the chuck shown in FIG. 9 taken along the same line as that of FIG. 7.
Figure 12:
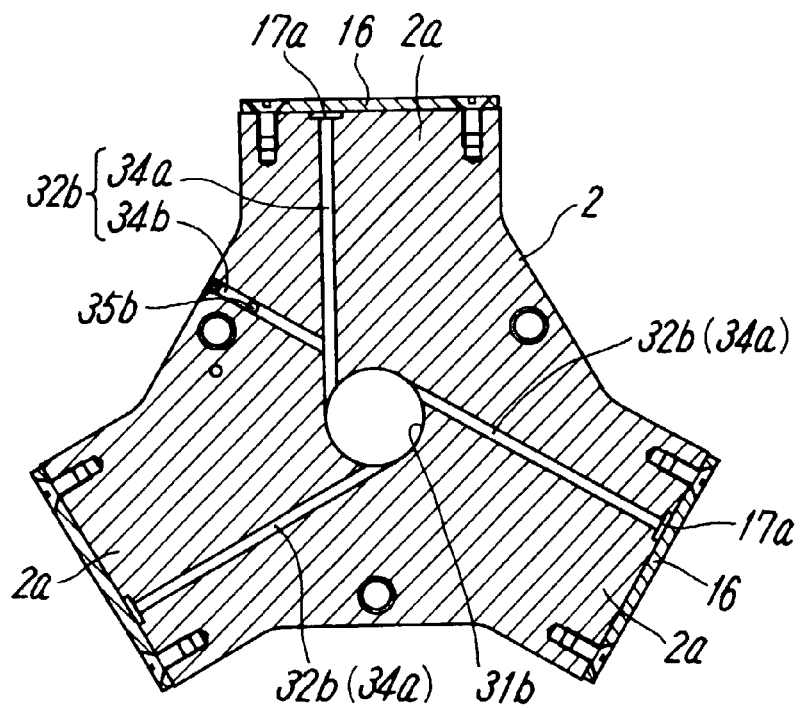
FIG. 12 is a sectional view of the chuck shown in FIG. 9 taken along the same line as that of FIG. 8.

As shown in FIGS. 4, 7 and 8, first and second distribution flow paths 32a and 32b which respectively brings the two central flow paths 31a and 31b into communication with the pressure chambers 18a and 18b on the opposite sides of the piston 13 are formed in the chuck body 2 at positions corresponding to the three cylinder mechanisms 4. The distribution flow paths 32a and 32b respectively extends from the central flow paths 31a and 31b toward the cylinder mechanisms 4 on upper and lower two flat surfaces which are perpendicular to the center axis L1 of the chuck body 2 and respectively corresponds to the two central flow paths 31a and 31b. As shown in FIG. 7, the first distribution flow path 32a which is in communication with the first central flow path 31a is in communication with the first pressure chamber 18a on the side of the rod. As shown in FIG. 8, the second distribution flow path 32b which is in communication with the second central flow path 31b is in communication with the second pressure chamber 18b on the side of the rod through the groove (see FIG. 6) 17a provided in the elastic body 17 inside the hole lid 16.

Here, each of the first and second distribution flow paths 32a and 32b includes a main flow path 34a which extends parallel to the radial axis L2 and which is in communication with the pressure chambers 18a and 18b, and auxiliary flow paths 34b which extends from a side surface of the chuck body 2 in the center axis L1 direction and in communication with the main flow path 34a and the central flow paths 31a and 31b. Since one flow path whose intermediate portion is bent can not formed by boring work, the straight main flow path 34a and the auxiliary flow path 34b as shown are combined, thereby forming the distribution flow paths 32a and 32b which connect the pressure chambers 18a and 18b and the central flow paths 31a and 31b. In this case, an unnecessary opened end of the auxiliary flow path 34b is closed with a plug.

A portion of the three sets of the distribution flow paths 32a and 32b corresponding to the three cylinder mechanisms 4 is connected to the ports P1 and P2. In the illustrated example, the auxiliary flow path 34b in the first distribution flow path 32a of the three sets of the distribution flow paths 32a, 32a, 32a, is connected to the first port P1 through a communication hole 35a, and the auxiliary flow path 34b in the distribution flow path 32 of the three sets of the second distribution flow paths 32b, 32b, 32b is connected to the second port P2 through a communication hole 35b.

By forming the flow path assembly 6 by combining the central flow paths 31a and 31b and the distribution flow paths 32a and 32b, it is possible to efficiently connect the pressure chambers 18a and 18b and the ports P1 and P2 of each of the cylinder mechanisms 4 with each other while keeping the thin thickness of the chuck body 2.

In the chuck 1A having the above structure, if pressure fluid such as compressed air is supplied from the two ports P1 and P2, the pressure fluid passes through the distribution flow paths 32a and 32b from the central flow paths 31a and 31b and are supplied to the pressure chambers 18a and 18b of the cylinder mechanism 4. The piston 13 and the piston rod 14 move forward and backward to move the jaw members 3 forward and backward in the radial direction. A work piece is grasped by the jaw members 3 through attachments (not shown) mounted to the jaw members 3. At that time, motions of the jaw members 3 are synchronized by the synchronizing mechanism 5 comprising the central member 25 and the links 26.

It is possible to provide the chuck with a detection device for detecting the operating positions of the jaw members 3. The detection device may be of electric type, magnetic type or optical type, and its type is not limited if the device can detect the motions of the jaw member 3, the piston 13 or the piston rod 14. In the illustrated example, a magnetic detection device comprising a permanent magnet and a magnetic sensor is used. That is, as shown in FIGS. 1, 4 and 5, the permanent magnet 38 is mounted to the piston 13 of any one of the cylinder mechanisms 4, two magnetic sensors 39 and 39 are respectively mounted into two mounting grooves 40 and 40 formed on the side surfaces of the chuck body 2, and the magnetic sensors 39 and 39 detect both the forward and backward stroke positions of the piston 13. The mounting groove 40 may be formed in one or both side surfaces of one of the extending portion 2a.

FIGS. 9 to 12 show a second embodiment. A chuck 1B of the second embodiment is different from the chuck 1A of the first embodiment mainly in that the rotary support shaft 27 of the central member 25 constituting the synchronizing mechanism 5 has larger diameter than that of the first embodiment, and the rotary support shaft 27 is hollow and its through hole 27a can be used for allowing a pipe, or other mechanical or electrical member to pass therethrough.

Since the diameter of the rotary support shaft 27 is increased, the diameter of the support hole 28 into which the rotary support shaft 27 is fitted and diameters of the central flow paths 31a and 31b of the outer peripheries of the rotary support shaft 27 are also increased. Therefore, when the central flow paths 31a and 31b and the pressure chambers 18a and 18b of the cylinder mechanism 4 are connected to each other through the distribution flow paths 32a and 32b, they can be brought into communication with each other only through the main flow path 34a, and it is unnecessary to establish the communication by combining the main flow path 34a and the auxiliary flow path 34b with each other unlike the first embodiment. When the distribution flow paths 32a and 32b and the ports P1 and P2 are brought into communication with each other, a portion of the distribution flow paths 32a and 32b is provided with the auxiliary flow path 34b by branching to bring the auxiliary flow path 34b into communication with the ports P1 and P2 through the communication holes 35a and 35b like the first embodiment.

Other structures and the effect of the second embodiment except those explained above are substantially the same as those of the first embodiment and thus, the same essential portions of the second embodiment are designated with the same symbols as those in the first embodiment, and an explanation thereof is omitted.

In each of the embodiments, as examples of the long circular cross sections of the cylinder hole 12 and the piston 13, the semi-circular portions 12a located at the opposite ends of the long axial direction and having the certain radius of curvature, and the straight line portions 12b connecting the semi-circular portions 12a are indicated. In the conception of this long circular shape of course includes an ellipse or a rectangular shape whose four corners are rounded into arcs.

As described in detail, according to the present invention, in the three directional opening/closing chuck for opening and closing the three jaw members to grasp a workpiece, the cylinder mechanism which drives each jaw member is formed into a special structure, thereby making it possible to obtain thin chuck as a whole and to obtain a great grasping force.

The invention claimed is:

1. A three directional opening and closing chuck comprising a chuck body having a plurality of ports, three jaw members movably disposed in the radial direction around a center axis of the chuck body, three cylinder mechanisms for individually driving the jaw members, a synchronizing mechanism for synchronizing motions of the three jaw members, and a flow path assembly connecting the ports and the cylinder mechanisms, wherein each of the cylinder mechanisms includes a cylinder hole having a long circular cross section, a piston which slides in the cylinder hole and has a long circular cross section, and a piston rod extending from the piston, the cylinder mechanism being disposed at a position in the chuck body which is adjacent to a corresponding jaw member in a state in which an axis of the cylinder hole is in a direction parallel to a moving direction of the jaw member and a shorter diameter of the cylinder hole is directed in an axial direction of the chuck body.

2. A three directional opening and closing chuck according to claim 1, wherein shapes of cross sections of the cylinder hole and the piston comprise long circular shapes comprising semi-circular portions located at opposite ends of a long axial direction and straight line portion connecting the semi-circular portions, a length dimension of the straight line portion being 1.5 times or more than a radius of the semi-circular portions.

3. A three directional opening and closing chuck according to claim 1, wherein the synchronizing mechanism includes a central member rotatably disposed on the center axis of the chuck body, and a link for connecting to the piston rod and jaw member of the cylinder mechanism three connection arms extending in the radial direction of said central member, and wherein the central member includes a recessed escaping portion into which a tip end of the piston rod is fitted at the forward stroke end between the adjacent connection arms.

4. A three directional opening and closing chuck according to claim 2, wherein the synchronizing mechanism includes a central member rotatably disposed on the center axis of the chuck body, and a link for connecting to the piston rod and jaw member of the cylinder mechanism three connection arms extending in the radial direction of said central member, the central member including a recessed escaping portion into which a tip end of the piston rod is fitted at the forward stroke end between the adjacent connection arms.

5. A three directional opening and closing chuck according to claim 3, which comprises a first and second connection pair wherein one end of the link and the piston rod and the jaw member are rotatably connected with each other by said first connection pin which connects the piston rod and the jaw member with each other, and the other end of the link and the connection arm of the central member are rotatably connected to each other by said second connection pin.

6. A three directional opening and closing chuck according to claim 4, which comprises a first and second connection pin wherein one end of the link and the piston rod and the jaw member are rotatably connected with each other by said first connection pin which connects the piston rod and the jaw member with each other, and the other end of the link and the connection arm of the central member are rotatably connected to each other by said second connection pin.

7. A three directional opening and closing chuck according to claim 3, wherein the flow path assembly includes two central flow paths arranged on an outer periphery of a rotary support shaft located at a center of the central member, a plurality of distribution flow paths extend from the central flow paths toward the cylinder mechanism through the chuck body and which are respectively in communication with pressure chambers on opposite sides of the piston, and wherein a portion of the distribution flow paths is in communication with the ports.

8. A three directional opening and closing chuck according to claim 4, wherein the flow path assembly includes two central flow paths arranged on an outer periphery of a rotary support shaft located at a center of the central member, and a plurality of distribution flow paths which extend from the central flow paths toward the cylinder mechanism through the chuck body and which are respectively in communication with pressure chambers on opposite sides of the piston, and wherein a portion of the distribution flow paths is in communication with the ports.

9. A three directional opening and closing chuck according to claim 7, wherein the cylinder mechanism includes a hole lid which closes an outer end of the cylinder hole, and an elastic body which is mounted to an inner surface of the hole lid and functions as a seal of the pressure chamber and a damper for the piston, and wherein the elastic body includes a groove which brings an end of the distribution flow path and the pressure chamber.

10. A three directional opening and closing chuck according to claim 8, wherein the cylinder mechanism includes a hole lid which closes an outer end of the cylinder hole, and an elastic body which is mounted to an inner surface of the hole lid and functions as a seal of the pressure chamber and a damper for the piston, and wherein the elastic body includes a groove which brings an end of the distribution flow path and the pressure chamber.

11. A three directional opening and closing chuck according to claim 3, wherein at a central portion between the central member and the rotary support shaft a through hole is provided.

12. A three directional opening and closing chuck according to claim 4, wherein at a central portion between the central member and the rotary support shaft a through hole is provided.

* * * * *